United States Patent
Mizuta

[19]

[11] Patent Number: 5,899,310
[45] Date of Patent: May 4, 1999

[54] STRUCTURE OF CLUTCH PLATE AND PRODUCTION METHOD OF SAME

[75] Inventor: Muneo Mizuta, Fuji, Japan

[73] Assignee: Jatco Corporation, Fuji, Japan

[21] Appl. No.: 08/869,850

[22] Filed: Jun. 5, 1997

[30] Foreign Application Priority Data

Jun. 5, 1996 [JP] Japan .................................. 8-143162

[51] Int. Cl.⁶ .................................................. F16D 69/04
[52] U.S. Cl. ...................................... 192/107 R; 156/291
[58] Field of Search ........................... 192/70.14, 107 R; 188/73.1, 73.2; 156/267, 268, 291; 428/66.2, 444

[56] References Cited

U.S. PATENT DOCUMENTS

| | | | |
|---|---|---|---|
| 1,414,490 | 5/1922 | Tressler | 192/107 R X |
| 1,620,043 | 3/1927 | Stanley | 192/107 R |
| 1,656,778 | 1/1928 | Desroziers | 192/107 R |
| 1,846,560 | 2/1932 | Kattwinkel | 192/107 R |
| 2,054,210 | 9/1936 | Weisenburg | 192/107 R |
| 2,059,576 | 11/1936 | Glick | 192/107 R |
| 2,062,480 | 12/1936 | Stanley | 192/70.14 X |
| 2,406,653 | 8/1946 | Batchelor | 192/107 R X |
| 2,581,926 | 1/1952 | Groten et al. | 192/107 R X |
| 5,141,083 | 8/1992 | Burgoon | 188/73.1 |
| 5,322,151 | 6/1994 | Denton et al. | 192/107 R X |

FOREIGN PATENT DOCUMENTS 62-172826  11/1987  Japan .

*Primary Examiner*—Rodney H. Bonck
*Attorney, Agent, or Firm*—Jacobson, Price, Holman & Stern, PLLC

[57] ABSTRACT

A structure of a clutch plate is provided which is capable of retaining its stable quality without any chemical treating agent. In the clutch plate structure, laminar facings (9, 9) are attached to the sides (8, 8) of a metallic core plate (7) with a binding material (10), and a plurality of concaves (11 . . . ) filled with the binding material (10) are formed physically in the sides (8, 8) so that the adhesion area on the side of the core plate (7) becomes larger.

5 Claims, 5 Drawing Sheets

STRUCTURE OF CLUTCH PLATE AND PRODUCTION METHOD OF SAME

BACKGROUND OF THE INVENTION

1. Field of the Invention

This invention relates to a structure of a clutch plate of an automatic transmission principally used for controlling the transmission of driving force in a vehicle, and relates to a method of producing it.

2. Description of the Prior Art

As shown in FIG. 9, there has been known a conventional structure of a clutch plate as disclosed in, for example, Japanese Utility Model Application Early Laid-Open Publication No. Sho 62-172826.

In this type of clutch plate structure, liquid binding materials 3, 3 are applied to both side portions 2, 2 of a metallic core plate 1 shaped substantially like a disk, and facings 4,4 used as a friction member are attached thereto. The facing 4 is made of base paper and has the shape of a laminar disk.

In this clutch plate 5, as shown in FIG. 10, generally, the grease of the core plate 1 formed by draw-molding is removed with a detergent, and thereafter etching treatment of the core plate 1 is conducted chemically with a hydrochloric acid or nitric acid treating agent, so that coarse grounds having greater adhesive strength are formed on the side portions 2, 2. After that, the liquid binding material 3 is applied to the side portions 2, 2 of the core plate 1 on which the etching treatment has been completed.

In order to heighten durability, an impregnant is impregnated into the base paper of the friction member, and then the friction member is punched to be shaped substantially like a disk, and the facings 4, 4 are formed. Thereafter, the facings 4, 4 are attached to the side portions 2, 2, respectively, with the binding material 3. After the adhesion has been completed, the clutch plate 5 is obtained via drying, sizing, and grooving processes.

In the clutch plate 5 thus constructed, the grease of the core plate 1 is removed with a chemical agent, and thereafter etching treatment of the core plate 1 is conducted, and thus the core plate 1 is chemically coarsened. With the satisfactory adhesive strength of the binding materials 3, 3, the facings 4, 4 adhere to the side portions 2, 2.

After this treatment has been completed, the facings 4, 4 are attached to the side portions 2, 2 by means of the binding materials 3, 3. In this known clutch plate, a chemical material, such as a chemical agent and a treating agent, is required for a grease removal operation and etching treatment. However, there is a fear that, since the treating agent is intensely deteriorated with the passage of time, the deterioration thereof will make uneven the quality of a treated surface at the etching treatment, and the adhesive strength will be varied.

SAMMARY OF THE INVENTION

An object of the present invention is to provide a structure of a clutch plate which is capable of retaining its stable quality without any chemical treating agent, and provide a method of producing it.

The clutch plate structure according to an aspect of the present invention comprises a metallic core plate and a laminar friction member which is attached to each side of the metallic core plate with a binding material, wherein a concave portion filled with the binding material is formed in the side thereof by physical treatment.

In this clutch plate structure, since the concave portion filled with the binding material is formed in the side of the metallic core plate by physical treatment, an adhesion area on the side of the core plate becomes larger.

Therefore, the binding material to be applied is contained by the concave portion, and thereby the friction member can adhere to the side with satisfactory adhesive strength by coming into contact with the core plate in the larger adhesion area.

Preferably, the physical treatment is to blow a sand-grainy abrasive material.

In this clutch plate structure, a plurality of concaves are formed when a sand-grainy abrasive material is blown under the physical treatment, and any chemical treating agent is not required for the formation of the concave portions.

Therefore, the influence of deterioration of a chemical treating agent with the passage of time, or the like, is avoided, and thus ununiformity in the formation of the concave portion lessens to stabilize the formation quality.

Preferably, the concave portion is a small hole penetrating the core plate between both sides of the core plate.

In this clutch plate structure, since the concave portion is the small hole penetrating the core plate between the sides thereof, the friction members attached to both sides of the core plate are interconnected by the binding material contained by the small hole.

Therefore, the friction member can adhere to the side with further satisfactory adhesive strength.

A method of producing a clutch plate according to an aspect of the present invention comprises the steps of forming the concave portion in the side of the core plate by the physical treatment, applying the liquid binding material to the concave portion, and attaching the friction member to the side.

According to this method, the concave portion is formed physically in the side of the core plate, the liquid binding material is then applied to the concave portion, and the friction member is attached to the side.

Therefore, the liquid binding material is diffused in the concave portion, and thereby effective use is realized of an contact area, increased with the concave portion, where the liquid binding material comes into contact with the core plate, so that desirable adhesive strength can be obtained.

DETAILED DESCRIPTION OF THE PREFERRED EMBODIMENTS

Figure 1:
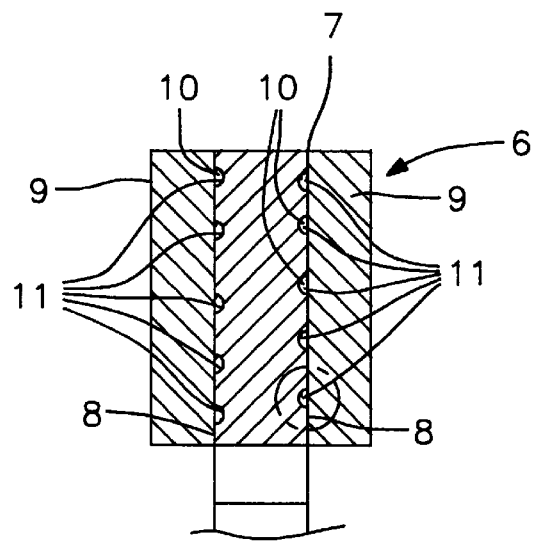
FIG. 1 is a sectional view of a structure of a clutch plate according to a first embodiment of the present invention, taken in the radial direction of the clutch plate.
Figure 1A:
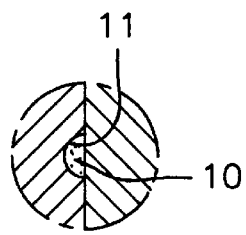
Figure 2:
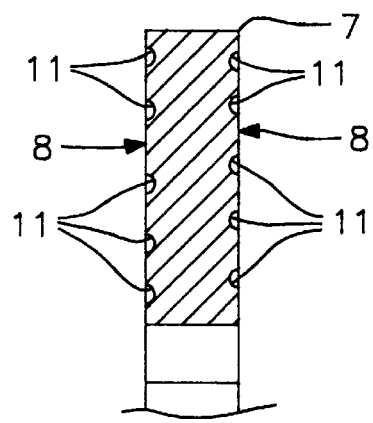
FIG. 2 is a sectional view of the clutch plate structure according to the first embodiment, taken along line A—A in FIG. 3 before a binding material is applied thereto.
Figure 3:
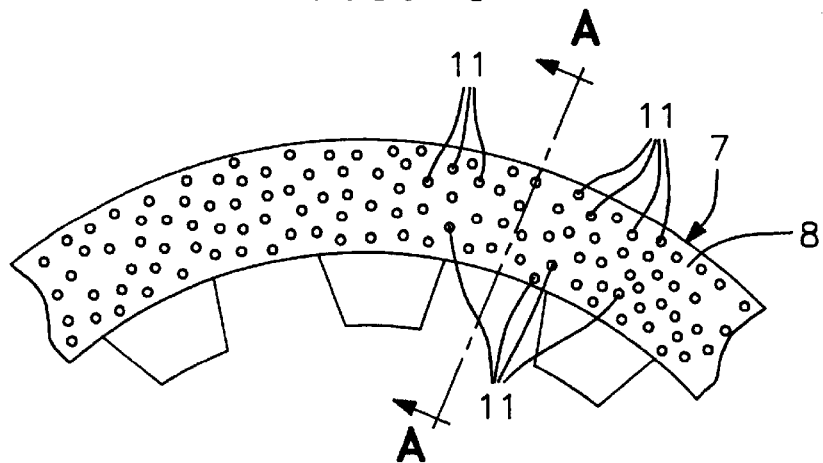
FIG. 3 is a side view of the clutch plate structure according to the first embodiment, taken before the binding material is applied thereto.

A first embodiment of the present invention will be hereinafter described with reference to the accompanying drawings. In this embodiment, the same numerals are each given to the same constituent parts as those of the conventional automatic transmission.

FIGS. 1 to 4 show a structure of a clutch plate according to the first embodiment of the present invention, and a method of producing the clutch plate. The clutch plate 6 comprises a substantially-discoidal metallic core plate 7, and facings 9, 9 used as laminar friction members which are attached to both sides 8, 8 of the metallic core plate 7 with a binding material 10. A plurality of concaves 11 . . . are formed in the sides 8, 8. The concaves 11 are formed physically by the so-called sand blast processing where a sand-grainy abrasive material is blown. Further, the concaves 11 have uneven configuration portions containing the binding material 10 which are formed adjacently to each other, and as a whole, the concave 11 is formed in a satinlike finish so as to have a larger adhesion area of the binding material 10.

Figure 4:
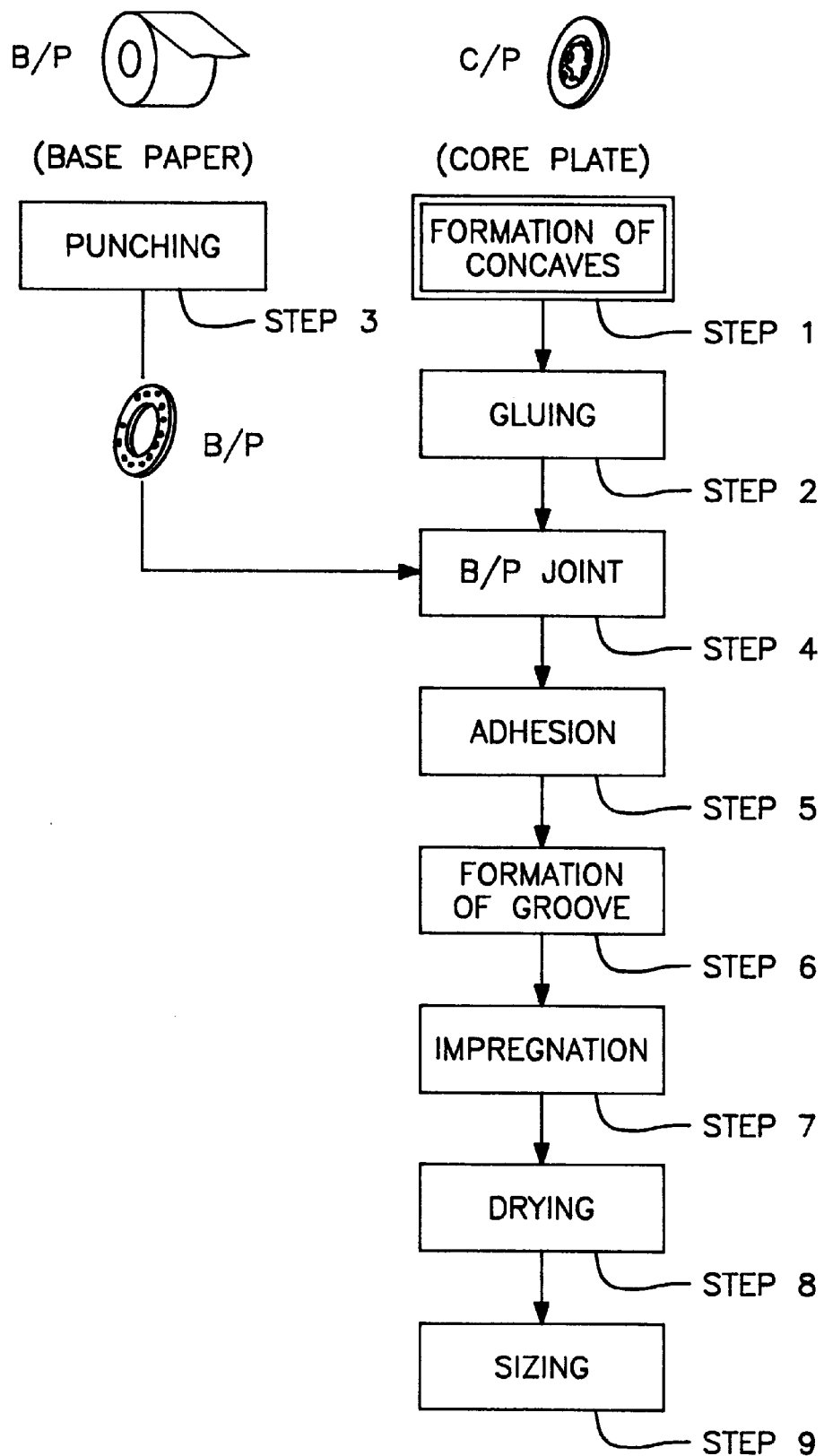
FIG. 4 is a flow chart of a method of producing the clutch plate according to the first embodiment.
Figure 5:
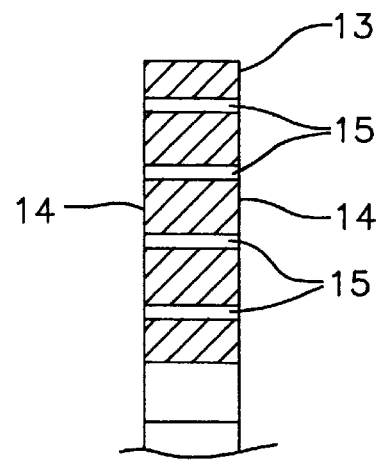
FIG. 5 is a sectional view of a clutch plate structure according to a second embodiment, taken along line B—B in FIG. 6 before a binding material is applied thereto.
Figure 6:
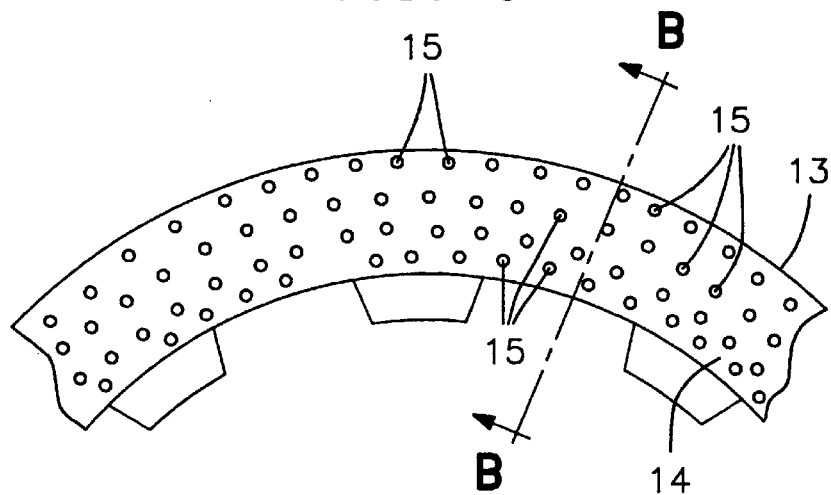
FIG. 6 is a side view of the clutch plate structure according to the second embodiment, taken before the binding material is applied thereto.
Figure 7:
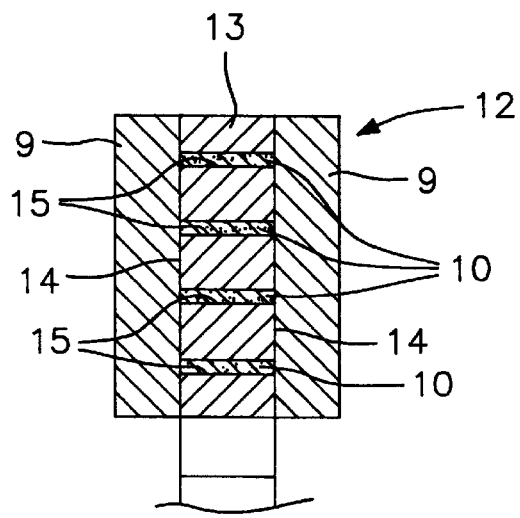
FIG. 7 is a sectional view of the clutch plate structure according to the second embodiment, taken in the radial direction of the clutch plate before the binding material hardens.

Next, there will be explained the method of producing the clutch plate 6 according of the first embodiment, with reference to FIG. 4.

In the clutch plate 6, the core plate 7 is pressed to be formed in the shape of a disk. Thereafter, the sand-grainy abrasive material is blown onto the sides 8, 8 by the sand blast processing of Process 1, so that the plurality of concaves 11 are formed physically.

In Process 2, the liquid binding material 10 is applied substantially to the entire surfaces of both sides 8, 8 so as to fill the concaves 11 therewith.

In Process 3, base paper as a raw material is punched to have a substantially discoidal configuration. Thereby, the facings 9, 9 are formed.

In Process 4, the facings 9, 9 are joined to the sides 8, 8 and, in Process 5, are attached to the sides 8, 8 by the adhesive strength of the binding material 10.

After the adhesion, in Process 6, a surface of each of the facings 9, 9 is processed in a radial direction to form a groove through which lubricating oil is supplied.

In Process 7, in order to heighten durability, the base paper is impregnated with an impregnant.

In Process 8, the base paper is dried to fix the impregnant into the base paper.

In Process 9, sizing is conducted. In the sizing, the clutch plate 6 is pressed from both the sides, so that the entire thickness thereof is adjusted, and the density of the facings 9, 9 is heightened. The clutch plate 6 is substantially completed.

Next, the operation in the first embodiment will now be described.

The plurality of concaves 11 filled with the binding material 10 are formed physically in the sides 8, 8 of the core plate 7 so that the adhesive area on the side of the core plate becomes larger.

Therefore, since the binding material 10 to be applied is contained by the plurality of concaves 11, the binding material can have satisfactory adhesive strength by coming into contact with the core plate 7 in the larger adhesion area as shown in FIG. 1, and can have higher shear strength in a shear direction so that the facings 9, 9 adhere.

Additionally, since the concaves 11 are formed by blowing a sand-grainy abrasive material, such a chemical treating agent as in the conventional processing is not required for forming the concaves 11.

Therefore, since the influence of deterioration, or the like, of a chemical treating agent with the passage of time is avoided, ununiformity in forming the concaves 11 is lessened, and a substantially-uniform satin finish is always obtained. Thus, the quality can be stabilized.

Accordingly, the adhesive strength between the sides 8, 8 of the core plate 7 and the facings 9, 9 can always be kept substantially constant.

Additionally, the concaves 11 are formed physically in the sides 8, 8 of the core plate 7, the liquid binding material 10 is then applied to the concaves 11, and the facings 9, 9 are attached to the sides 8, 8.

Therefore, the liquid binding material 10 is diffused in each of the concaves 11, and effective use is made of the uneven configuration of the concaves 11 and an increased area of the binding material 10 in contact with the core plate 7. Thus, desirable adhesive strength can be obtained.

FIGS. 5 to 8 show a structure of a clutch plate according to a second embodiment, and a method of producing the clutch plate. In this embodiment, the same numerals are each given to the same constituent parts as in the first embodiment.

In a clutch plate 12 according to the second embodiment, a plurality of small holes 15 . . . are formed which are used as concave portions and penetrate a core plate 13 between both sides 14, 14 thereof.

Next, the operation in the second embodiment will be described.

Since the plurality of small holes 15 which are used as concave portions and penetrate the core plate 13 between both the sides 14, 14 are formed in the clutch plate 12 according to the second embodiment, the facings 9, 9 attached to the sides 14, 14 of the core plate 13 are interconnected by the binding material 10 contained by each of the small holes 15.

Therefore, the facings 9, 9 can adhere to the sides 14, 14 of the core plate 13 with further satisfactory adhesive strength and higher shear strength in a shear direction.

Figure 8:
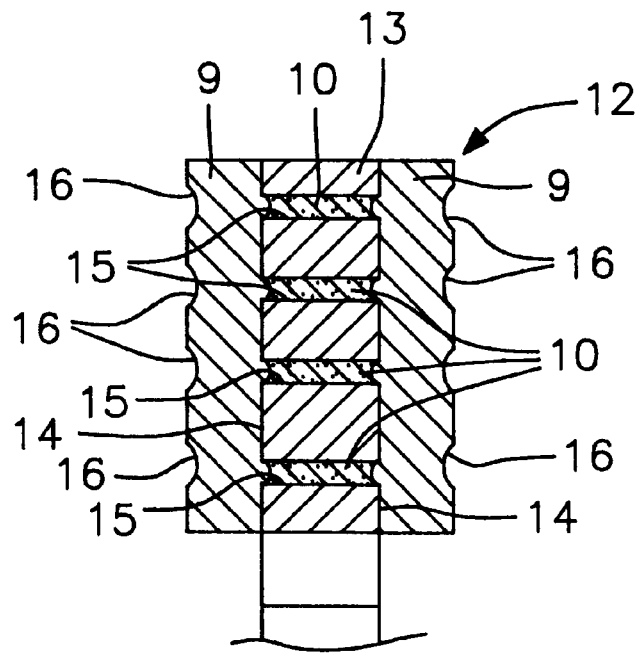
FIG. 8 is a sectional view of the clutch plate structure according to the second embodiment, taken along the radial direction of the clutch plate after the binding material has hardened.
Figure 9:
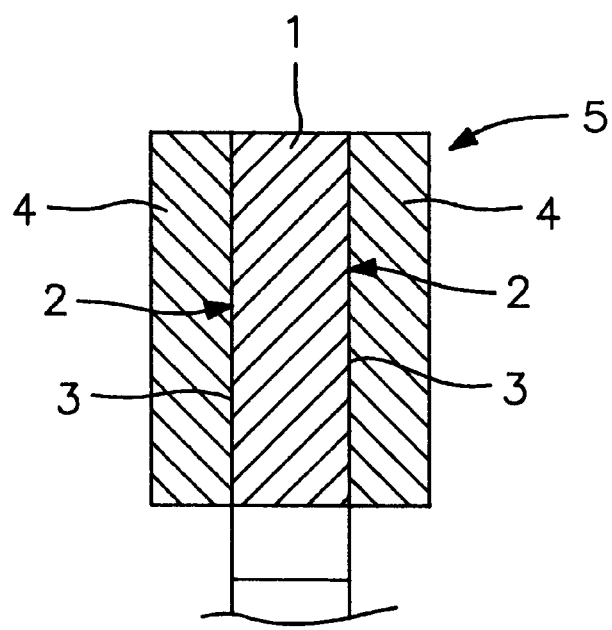
FIG. 9 is a sectional view of a structure of a conventional clutch plate, taken in the radial direction of the clutch plate.
Figure 10:
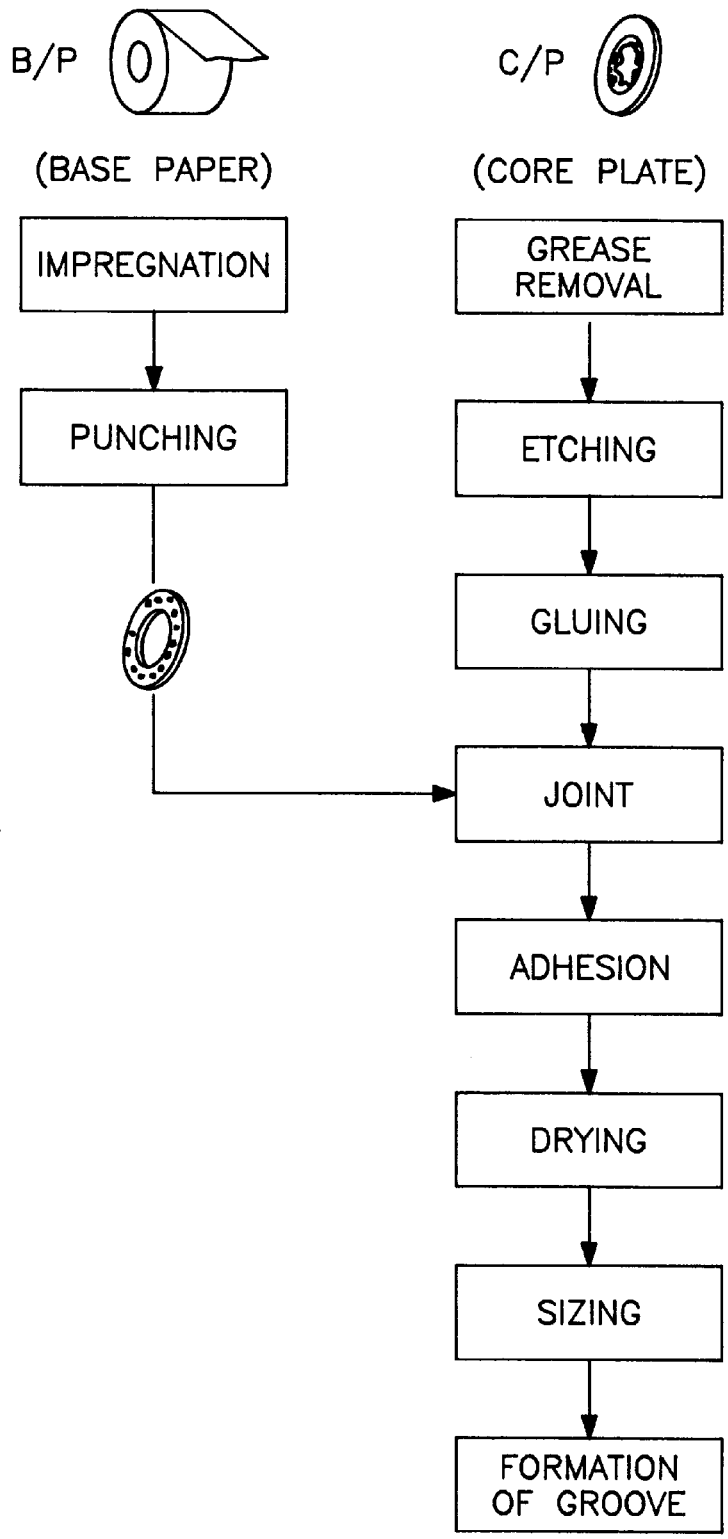
FIG. 10 is a flow chart of a method of producing the conventional clutch plate.

Additionally, as shown in FIG. 8, the binding material 10 with which the small holes 15 are filled contracts when hardening.

Because of this contraction, oil-puddle portions 16 are formed on the surface of the facing 9, so that lubricating oil can be collected and stay in the oil-puddle portions 16.

A description of the other constructions and operations in this embodiment will be omitted because it is almost the same as that in the first embodiment.

The details of the first and second embodiments of the present invention were described with reference to the attached drawings, as mentioned above. However, the present invention is not limited to these embodiments. The present invention may be embodied in other modifications without departing from the sprit or essential characteristics of the present invention.

In the first and second embodiments, for example, a description was given of the clutch plate used for the automatic transmission or the like. However, the present invention is not limited to this. For example, one that is used for another part, such as a center differential clutch, or one that is used in any other part, may be used.

Further, in the first and second embodiments, for example, the concaves 11 or the small holes 15 are formed in the sides 8, 14 of the core plates 7, 13 by the sandblast processing or the like. However, the present invention is not limited to this. As long as concave portions are formed under physical treatment, for example, as long as cuts are formed in the substantially entire surfaces of the sides 8, 14 with, for example, a coarse-grained file so as to form concave portions by which an adhesion area of the sides 8, 14 with the binding material 10 becomes larger, the configuration, number, position, and the like, of the concave portions are not specifically limited.

Further, a grease removal process is omitted in the processes according to the first embodiment. However, a grease removal process may be conducted as a process prior to Process 1.

Further, the impregnation process is conducted as Process 7 following the adhesion process in the processes according to the first embodiment. However, the present invention is not limited to this. For example, the impregnation process may be conducted as a process prior to Process 1 conducted as the press process.

Further, a groove-forming process is defined as Process 6. However, the present invention is not limited to this. For example, the groove-forming process may be conducted as a post-process of Process 9 conducted as the sizing process.

As mentioned above, according to an aspect of the present invention, the concave portions filled with the binding material are formed in the sides of the core plate under physical treatment so that an adhesive area on the side of the core plate becomes larger.

Therefore, the binding material with which the concave portions are filled has satisfactory adhesive strength by coming into contact with the core plate in the larger adhesion area, so that the friction member can adhere to the side.

According to another aspect of the present invention, since the plurality of concaves are formed under the physical treatment where a sand-grainy abrasive material is blown, any chemical treating agent is not required for forming the concave portions.

Therefore, the influence of deterioration of a chemical treating agent with the passage of time is avoided. Thus, ununiformity in the formation of the concave portion is lessened, and the formation quality can be stabilized.

According to another aspect of the present invention, the concave portion is the small hole penetrating the core plate between both sides thereof. Thus, the friction members attached to the sides of the core plate are interconnected by the binding material contained by the small hole.

Therefore, the friction member can adhere to the side with further satisfactory adhesive strength.

According to still another aspect of the present invention, the concave portion is formed in the side of the core plate under the physical treatment, the liquid binding material is then applied to the concave portion, and the friction member is attached to the side.

Therefore, the liquid binding material is diffused in the concave portion, and thereby effective use is realized of an contact area, increased with the concave portion, where the liquid binding material comes into contact with the core plate. Thus, desirable adhesive strength can be obtained.

Accordingly, the adhesive strength between the sides of the core plate and the friction members can always be kept substantially constant. This is useful in practice.

What is claimed is:

1. A structure of a clutch plate comprising:

a metallic core plate; and a laminar friction member which is attached to each side face of said core plate with a binding material;

wherein concave portions are formed in the side face of said core plate by physical treatment each concave portion having a predetermined depth;

the concave portions are filled with said binding material whereby the laminar friction member is attached to the core plate; and a side face of the laminar friction member is provided with depressions, each depression being formed in correspondence with a position of the concave portion of the core plate facing an opposite side face of the laminar friction member.

2. A structure of a clutch plate according to claim 1, wherein said binding material is a liquid binding material that contracts when hardening.

3. A structure of a clutch plate according to claim 1, wherein said physical treatment is to blow a sand-grainy abrasive material.

4. A structure of a clutch plate according to claim 1, wherein said concave portions are each a small hole penetrating said core plate between the side faces of said core plate.

5. A method of producing the clutch plate according to claim 1, comprising the steps of:

forming said concave portions in the side face of said core plate by said physical treatment;

applying said liquid binding material to said concave portions; and attaching said friction member to the side face of said core plate.

\* \* \* \* \*